M. GOEHLER.
MILKING DEVICE.
APPLICATION FILED NOV. 18, 1913.
1,093,845.
Patented Apr. 21, 1914.
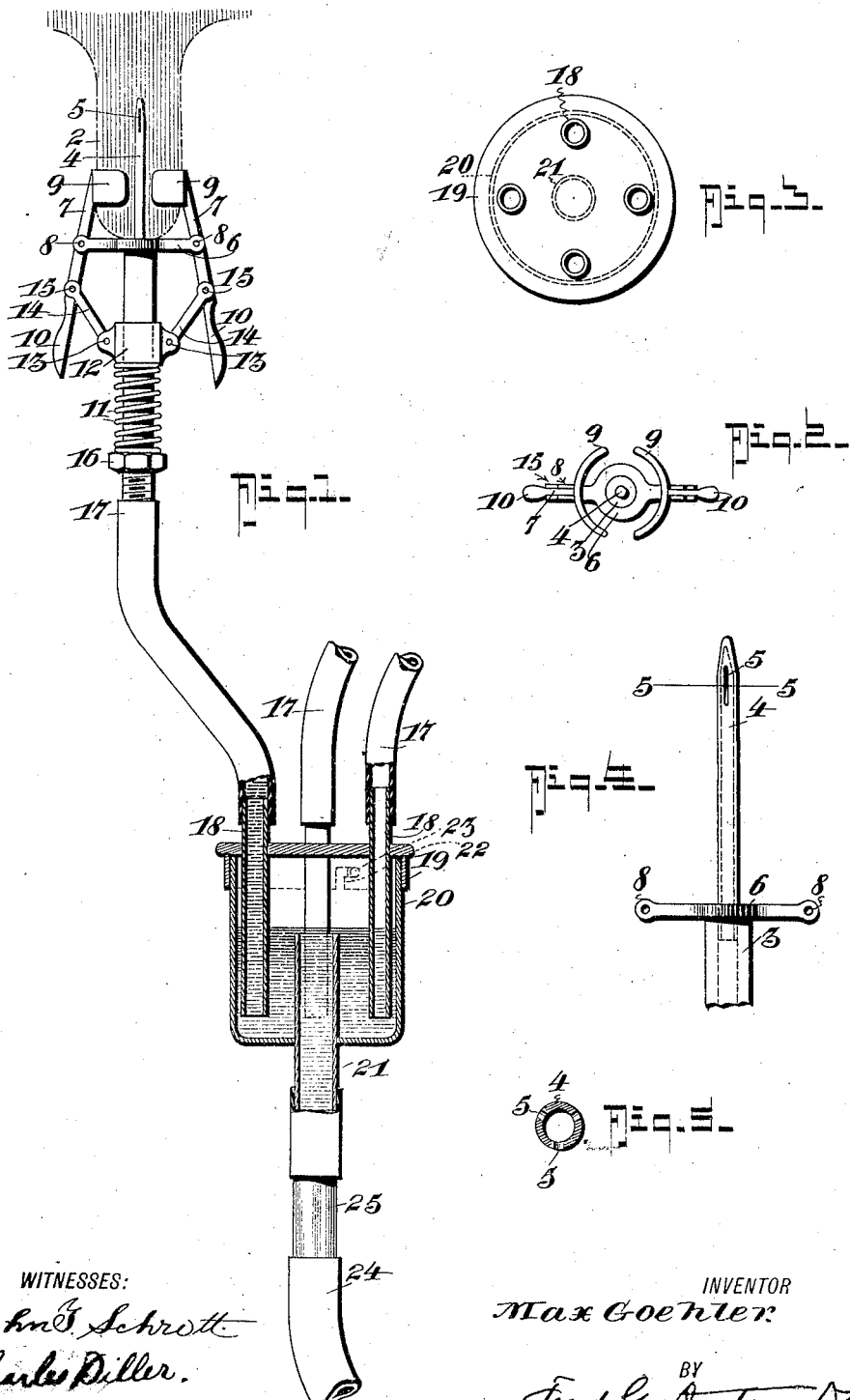
WITNESSES:
John F. Schrott
Charles Diller
INVENTOR
Max Goehler
BY
Fred G. Dieterich
ATTORNEYS.

UNITED STATES PATENT OFFICE.

MAX GOEHLER, OF VANCOUVER, BRITISH COLUMBIA, CANADA.

MILKING DEVICE.

1,093,845.  Specification of Letters Patent.  Patented Apr. 21, 1914.

Application filed November 18, 1913. Serial No. 801,675.

*To all whom it may concern:*

Be it known that I, MAX GOEHLER, a citizen of the Swiss Republic, residing at Vancouver, in the Province of British Columbia, Canada, have invented certain new and useful Improvements in Milking Devices, of which the following is a specification.

This invention relates to a cow milking machine of that class wherein the milk is withdrawn from the teat without suction and without any mechanical action being applied to the udder.

The improvements are directed to the means by which the hollow silver needle through which the milk is withdrawn is supported in the teat of the animal without any necessity for much handling and also in the provision whereby air is prevented from entering the teat so that the outflow of the milk is uninterrupted.

The invention is particularly described in the following specification, reference being made to the drawings by which it is accompanied, in which:

Figure 1 shows the apparatus complete with one teat attachment, the air sealing milk collecting vessel being in section. Fig. 2 is a plan of the teat attachment. Fig. 3, a plan of the collecting vessel. Fig. 4, an enlarged detail of the teat needle, and Fig. 5 is a cross section of the same on the lines 5—5 on Fig. 4.

In these drawings 2 represents in dot and dash lines the lower part of the udder and the teat of a cow; 3 is a tube which is connected to each individual teat, in the upper end of which tube is removably socketed a hollow silver needle 4 having a series of elongated slits 5 near the upper end, as shown in Fig. 4.

Extending across the upper end of the tube 3 at the place of attachment of the needle 4 is a fulcrum bar 6, on each end of which at 8 is pivotally mounted a clamp lever 7. The end of each lever 7 projects about halfway up the needle 4 and has a crescent shaped end 9 to bear against and secure a hold of the teat in which the needle is inserted. Below the fulcrum 8 these levers 7 are produced to form finger engagements 10 by pressing which together releases the crescent ends 9 from engagement with the teat. These teat holding levers 7 are normally pressed into engagement with the teat in the duct of which the needle 4 is inserted, by a spring 11 coiled on the lower end of the tube 3 and acting between a nut 16 threaded on the tube 3 and the underside of a sleeve 12 slidable on the tube, which sleeve is pin-connected on each side at 13 to a link 14 which is also pin-connected at 15 to the lever 7 intermediate of the fulcrum 8 and the finger engagement 10. By this means the action of the spring 11 forces up the sleeve 12 and pushes outward the lower ends of the lever 7 to press inward the crescent shaped ends of these levers to grip the teat, and this grip may be relieved by pressing the finger engaging ends 10 of these levers together. The strength of the spring may be adjusted by the nut 16 to give the required holding grip.

On the tube 3 below the nut 16 is attached a flexible tube 17 by which each teat attachment is connected to a tube 18 in the cover 19 of a collecting vessel 20. These tubes 18 project below the cover 19 to approximately the bottom of the vessel 20 and the delivery pipe 21 from the vessel projects upward within the vessel to above the lower ends of the tubes 18 so that when the milk begins to flow over 21 a liquid seal prevents air passing up to the teat.

The cover 19 is removably attached to the vessel by any convenient means. It is here shown as secured by an L shaped slot 22 on each side of the cover engaging a pin 23 projecting from each side of the vessel. The tube 21 delivers into the milk pail by means of a flexible tube 24 in which a glass sight tube 25 is inserted through which the flow of milk may be observed.

In use, the crescent clamp members 9 being drawn apart by pressing together the ends 10 of the levers 7 between the fingers, the teat needle 4 is inserted in the duct of the teat of the animal up to the fulcrum bar 6. When the clamp levers are released the needle is supported and retained in the teat by the resilient grip of the crescent ends 9 on the lower part of it. As the milk flows through the hollow needle 4 and into the vessel 20 it rises over the lower ends of the tubes 18 and seals them, and thereafter flows over the upper edge of the delivery pipe 21 and into the milk pail.

I am aware that devices similar to what has been here described are used for the abstraction of milk from a cow but believe the use of a resilient teat clamping member in conjunction with the hollow needle to be new, as also is the use of a relatively small collecting vessel sealing with the first flow of milk the access of air to the teat.

What I therefore claim as new and desire to be protected in by Letters Patent, is:

1. In a milking device, the combination with a flexible tube connected to each teat of the animal, of a sealing vessel having a delivery tube to the milk pail projecting upward within it, a removable cover having a series of inlet tubes projecting through it within the vessel to below the level of the delivery outlet to each of which inlet tubes a teat tube is connected.

2. A milking device, comprising the combination with a hollow needle closed at its upper end and pointed and apertured near the upper end below the point which needle is socketed into a tube, of a resilient clamp secured to the upper end of the tube which clamp is adapted to resiliently grip the lower part of the teat, and means for flexibly connecting each teat tube to the milk pail.

3. A milking device, the combination with a series of teat attachments, of a vessel having a delivery pipe which is connected to a milk pail said vessel having a removable cover in which a number of pipes are secured corresponding to the teat attachments said pipes projecting into the vessel below the level of the delivery pipe therefrom and means for flexibly connecting the teat attachments to the inlet pipes of the vessel cover.

4. A milking device, comprising the combination with a tube for each teat of the animal in the upper end of which tube a hollow apertured needle is removably inserted, a finger operated clamp secured to each teat tube which clamp is adapted to normally resiliently grip the lower part of the teat, a sealing vessel having a series of tubes inserted in the cover and projecting to near the bottom of the vessel and a delivery outlet from the bottom of the vessel the upper end of which outlet is above the level of the inlet tubes, means for flexibly connecting each teat tube to an inlet tube of the vessel, and means for flexibly connecting the delivery outlet to the milk pail.

5. A milking device, comprising the combination with a teat tube, of a hollow needle removably inserted in the upper end of the teat tube and projecting upward therefrom, which needle is apertured in the upper end, opposed finger engaging levers pivotally connected to the teat tube the upper end of each lever having a crescent shaped portion adapted to grip the lower part of the teat, a sleeve slidably mounted on the teat tube below the fulcrum, a nut threaded on the teat tube below the sleeve, a coil spring between the nut and the sleeve and links pivotally connecting the sleeve to each clamp lever intermediate of the fulcrum and the finger engagement, and means for flexibly connecting the lower part of each teat tube to a sealing vessel which vessel delivers into the milk pail.

6. A milking device, comprising the combination with a teat tube from the upper end of which a hollow apertured needle projects, a finger operated clamp secured to each teat tube which clamp is adapted to resiliently grip the lower part of the teat, a spring simultaneously operating the clamp members to normally grip the teat, means for flexibly connecting each teat tube to an inlet tube in the cover of a sealing vessel which inlet tube projects below the level of the outlet tube, means for flexibly connecting the outlet tube to the milk pail, and a glass viewing tube between each teat connection and the pail.

In testimony whereof I affix my signature in presence of two witnesses.

MAX GOEHLER.

Witnesses:
ROWLAND BRITTAIN,
MAY WHYTE.